G. W. KINTZ.
Potato Digger.

No. 76,200.

Patented March 31, 1868.

Witnesses:
J. A. Davis
W. J. Creelman

Inventor:
Geo. W. Kintz
By J. Fraser & Co.
Attys.

United States Patent Office.

GEORGE W. KINTZ, OF WEST HENRIETTA, NEW YORK.

Letters Patent No. 76,200, dated March 31, 1868.

IMPROVEMENT IN POTATO-DIGGERS.

The Schedule referred to in these Letters Patent and making part of the same.

TO ALL WHOM IT MAY CONCERN:

Be it known that I, GEORGE W. KINTZ, of West Henrietta, in the county of Monroe, and State of New York, have invented certain new and useful Improvements in Machines for Digging Potatoes; and I do hereby declare that the following is a full and exact description thereof, reference being made to the accompanying drawings, making part of this specification.

Figure 1:
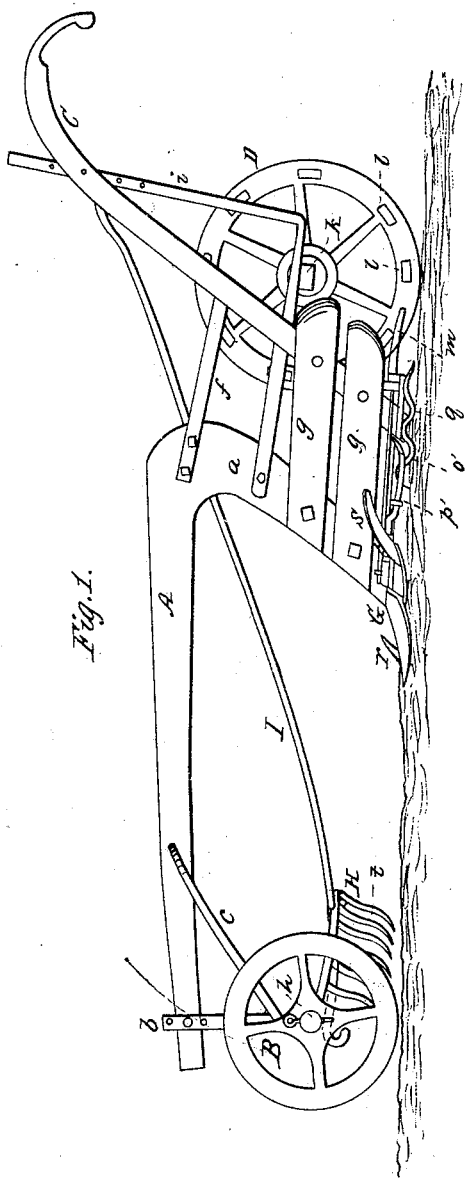

Figure 1 is a side elevation of my improved machine arranged as a digger.

Figure 2:
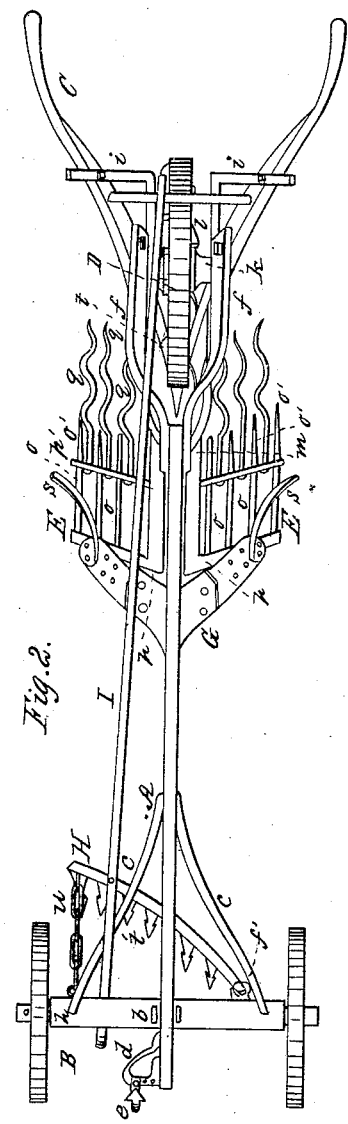

Figure 2, a plan of the same.

Like letters of reference indicate corresponding parts in both figures.

I obtained a patent for potato-digger, dated June 25, 1867. Some features in my present invention resemble those embodied in that machine, but the present improvement is intended to avoid difficulties and be more effective in operation.

In the drawings, A indicates the skeleton-beam, which is preferably made in a single piece, having the angle, $a$, turned down for the attachment of the operating parts. With the front end of this beam is connected a truck-frame, B, by means of a cleft standard, $b$, having a series of holes and a pin, which allow the said beam to be adjusted higher or lower at pleasure. Braces, $c\ c$, extend from axle $h$ to the side of the beam, for staying and strengthening the same. The front end of the beam has a clevis, $d$, attached, as shown, and in this clevis is made a series of adjusting holes, in any of which fits a hook, $e$. By this means the cut of the digger may be varied at pleasure, by simply shifting the position of the hook. This hook is swivelled to turn to any desired position. The handles C C are similar to those ordinarily used. They are held by stays, $ff$, at the top, which connect with the beam; and also by slats, $g\ g$, so attached to the sides as to allow a free passage. The rear of the handles also connects with bars, $i\ i$, having holes for the adjustment of said handles. At the bottom these bars are bent, and connect with the axle $k$ of a wheel, D, said axle also being adjusted forward or back by means of holes in the bars. The wheel D lessens the draught, and also serves other useful purposes. The edges of the rim of the wheel, on both sides, are provided with cams, $l\ l$, as shown, said cams being reversed in position on opposite sides. The cams, during the revolutions of the wheel, strike upon lever-arms $m\ m$ of shakers E E, situated on opposite sides of the machine, whereby a vibrating action is imparted to said shakers for sifting out the dirt from the potatoes. These shakers are so hinged as to allow this vibrating motion. The shakers are each provided with longitudinal open rods or teeth, $o\ o$, of suitable length, which are fastened in front to bars $p$, and rest in the centre in cross-bar $p'$. At the rear, these teeth incline upward as they extend backward, as shown at $o'$, somewhat in the form of the fingers of a grain-cradle. The object of this is to raise the potatoes from the dirt as they pass over the shakers, and thus free them, as far as possible, from all extraneous matter.

In the cross-bars $p'\ p'$ also rest spiral revolving tines or drags $q\ q$, which follow behind the teeth $o\ o'$, and, by their screw action, remove such dirt as is left clinging to the potatoes. They are also effective in breaking the hanging roots from the tubers, and also in clearing the shakers from the straggling vines which might otherwise become an impediment.

To the bottom of the skeleton-beam is attached a flat double-winged share or point, G, so formed, arranged, and situated as to run under the surface of the ground and raise it, without greatly disturbing the same, in which condition the soil containing the potatoes passes up over the shakers to be separated, as before described. The central front portion of this point or share has a vertical divider or cutter, $r$, which runs through the centre of the row and divides the hills in the proper manner, so that one-half passes over one shaker and one-half over the other. Were it not for this divider, the hills would not be well separated, and could not be divided till reached by the vertical part of the beam itself, in which case they would not slide up easily over the shakers, but would be thrown to one side. On each extremity of the share or point is also attached a wing, $s$, set at such an angle and in such a position as to hold the soil inward as it is raised upward by the shares, and thus direct it upon the shakers. These wings are of much importance in preventing the throwing off of the potatoes by the sides of the plough.

On the back of the axle $h$, and one side the centre, is jointed at $j$ a vine-puller, H, armed with forwardprojecting teeth, $t\ t$, which take hold of the vines. The loose end of the puller is connected by a chain or cord, $u$, with the axle, and limits its back motion. A rod, I is also jointed to the puller, with its front end passing loosely through an eye of the axle, and bent into a hook, or equivalent form, to prevent withdrawal, while the rear end extends back over the handles within reach of the operator, and is preferably formed into a hook-end to retain it in place.

In my patent before referred to, I employed a puller in the form of a fork, turning in a vertical plane. This present device is an improvement upon that, and is intended more particularly for pulling and throwing off the vines. To this end it will be noticed that the puller does not work back and forward in a vertical plane, but the swinging end is simply pushed forward and back by the handle I sliding in the eye attached to the axle. The angular position of the puller has a natural tendency to work the vines off, and when it becomes clogged or filled, the sudden pushing of the handle outward will throw off the vines in a heap with but little effort. This is far more effectual than simply a vertical swinging movement of the puller, as in my first case. A set of attachments, $j$, may be employed for adjusting the puller to different portions of the axle.

The double share or point G is intended for use in heavy soil. In very light soil, I prefer to employ in its place a single share or point, G', which is bolted to the point of the plough-beam after the double point has been removed.

What I claim as my invention, and desire to secure by Letters Patent, is—

1. The combination and arrangement of the revolving spiral tines $q\ q$ and the angular teeth $o\ o'$ with the vibrating shaker E, operating in the manner and for the purpose herein set forth.

2. The angular vine-puller H, jointed at one end, employed in combination with the rod I, having a free end movement, to discharge the vines, and a stay-chain, $u$, which limits the back motion, the whole arranged and operating in the manner and for the purpose herein set forth.

3. The construction and arrangement of the machine as a whole, consisting of the wheel D with cams $l\ l$, vine-puller H with rod I and chain $u$, shakers E E with arms $m$, share G with divider $r$ and wings $s\ s$, truck-frame B with adjustable standard $b$, and the skeleton-beam A, the whole operating as described.

In witness whereof, I have hereunto signed my name in the presence of two subscribing witnesses.

GEO. W. KINTZ.

Witnesses:
R. F. OSGOOD,
W. J. CREELMAN.